2,954,351
METHOD OF PREPARING PIGMENTED-DEXTRAN MODIFIED POLYESTERS

Leo J. Novak, Dayton, Ohio, assignor to The Commonwealth Engineering Company of Ohio, Dayton, Ohio, a corporation of Ohio No Drawing. Filed Dec. 20, 1955, Ser. No. 554,147

2 Claims. (Cl. 260—9)

This invention relates to pigmented polyester resins.

When pigments are dispersed in fluid, mobile, polymerizable polyester resins by the usual grinding and mixing procedures, the pigment tends to settle out if the polyester is allowed to stand for any appreciable time before it is used. A sediment forms which may be difficult to re-disperse in the polyester by vigorous stirring.

The dry pigments normally comprise groups or aggregates made up of pigment particles cemented together. These aggregates occur even when the pigment is finely ground and the origin thereof can be explained by the fact that the great majority of pigments are either precipitated in aqueous system or are wet-milled at some stage in their manufacture. The aqueous media contain at least traces of soluble salts which occur as by-products of the precipitation or which are leached out in the wet-milling operation. In some instances, the salts are added deliberately for a desired effect on the product.

In the subsequent drying processes which convert the powder to marketable form, the soluble materials function as cementing agents to bind one particle to another. Pulverizing the dried product destroys some of the bonds. However, in spite of mechanical screening, some of the aggregates persist and are not broken down by the grinding incidental to the dispersion of the pigment in the mobile, fluid polyester by mixing in the available conventional mixing devices.

When the polyester is allowed to stand, the pigment aggregates tend to settle out.

The object of the present invention is to provide new pigmented polyesters which do not present the problem of pigment settling and in which the pigment particles remain dispersed in the polyester.

This and other objects are accomplished by incorporating with the polyester, while it is in the fluid, mobile state, pigmented dextran, the dextran serving as a carrier for the pigment and as a dispersing and suspending aid therefor.

According to one embodiment of the invention, the pigmented dextran may be prepared by mechanically working the selected pigment, organic or inorganic, into a mass comprising dextran and water, a polyhydric alcohol, or water and a polyhydric alcohol, in an amount depending on the kind of mixing operation to be employed. A plasticizer for the dextran may be included in the mass to facilitate the working and intimate incorporation of the pigment.

When the pigment has been thoroughly and uniformly distributed through the dextran, the mass may be dried and ground to a fine powder for mixing with the polyester resin.

Any dextran may be used as carrier for the pigment, including the native high molecular weight polysaccharide produced by the action of strains of Leuconostoc on sucrose, and hydrolyzates thereof having a molecular weight between that of the native dextran and about 2000.

As is known, the native dextrans biosynthesized by the different strains of Leuconostoc differ in structural and physical characteristics including the 1,6 to non-1,6 linkages ratio, the extent of branching and the water-sensitivity. Any of the known dextrans may be used in practicing this invention, including those that are water-soluble. For many purposes, the water-insoluble dextrans may be preferred. Being hydroxylated materials, the dextrans usually take up sufficient water to permit mechanical working of the dextran-pigment mass even if the particular dextran does not actually dissolve in water. However, it is often preferred to incorporate the pigment into the dextran with the aid of a polyhydric alcohol, such as glycerol, a glycol, and so on which may replace water or be supplementary to it.

The amount of liquid (water, polyhydric alcohol, or mixture of water and polyhydric alcohol) used to form the dextran mass to be worked with the pigment may vary between about 1% and 50% by weight. When a polyhydric alcohol is used alone, somewhat smaller amounts (5% to 25%) may be used. The higher proportions of water or water-polyhydric alcohol combinations may be employed when the dextran is water-insoluble or when the pigment is to be incorporated by means of a mechanical stirrer and the mass must have sufficient fluidity to permit the beating.

Instead of or in addition to the polyhydric alcohol, small amounts, not in excess of 3%–5% by weight of the total mass, of a water-miscible organic non-solvent for the dextran, such as ethyl, methyl or isopropyl alcohol, acetone or dioxane, may be added to assist in controlling the viscosity.

The mechanical working of the dextran and pigment may be performed on a pair of heated mixing rolls rotating in opposite direction and which force the dextran-pigment mass between them. The liquid used has a dual function. It renders the mass sufficiently plastic for working and, when water is used, it tends, at the temperature of the rolls, to evaporate as steam creating between the roll and the mass a space occupied by steam which prevents sticking of the mass to the roll surface.

In one method of mixing the pigment into the dextran, the plastic mass consisting essentially of dextran, the pigment (in an amount of 1% up to 20% or higher by weight) and water is passed into the nip between the pair of rotatable rolls rotating in opposite directions. The surface of one of the rolls is maintained at a temperature of 105 to 110° C., while the surface of the other roll is maintained at a lower temperature, e.g., at about 40 to 85° C. A stream of water is continuously projected between the mass passing through the nip of the rolls and the surface of the roll heated to 105–110° C. The mass is thus worked between the rolls in the presence of a steam phase created between the mass and the hot surface (105–110° C.) by volatilization of the projected water. The dextran in the vicinity of the hot surface is thus prevented from sticking to the hot surface and adheres to, and is carried forward by, the surface maintained at the lower temperature.

According to another embodiment, a film is formed by mixing the dextran, water, and a polyhydric alcohol such as glycerin together, forming the mass into a layer and evaporating the water, leaving a dextran-glycerin film which can be broken up and milled with the pigment.

Or the pigment may be incorporated in the dextran-glycerine-water mass prior to forming the film, and the latter, in the pigmented condition, can be broken up and mixed with the fluid polyester.

The embodiment in which dextran containing glycerine or other polyhydric alcohol, such as a glycol or sorbitol, is used as carrier for the pigment represents a preferred embodiment of the invention.

The films including dextran, glycerin or the like and pigment may be used as such for various purposes. They may be, for instance, coated with the clear polyesters to provide waterproof pigmented films.

In working the pigment into the mass between rolls as described, strips of the mass may be cut off from the roll and mixed with the batch for re-working as required, until uniform distribution of the pigment in the dextran is achieved. Any method of incorporating the pigment into the dextran which results in uniform mixing of the two may be used.

Organic and inorganic pigments may be incorporated with the dextran. The selection of the pigment will depend, of course, on the effect desired on the polyester resin and the purpose for which it is to be employed.

Examples of pigments include the inorganic types such as titanium dioxide, iron oxide, carbon black, red lead, the chromates such as chrome yellow, chrome orange, molybdate orange, zinc yellow, and barium potassium chromate, the ferrocyanides such as iron blue and copper ferrocyanide maroon, and the mixed chromate-ferrocyanide, chrome green. Organic types of pigments for the present use include the pigment dyes toluidine red, para-reds, chlorinated para-reds, arylide reds and maroons, and Hansa yellow, precipitated pigments such as lithol reds and BON reds and maroons, the metallo-azo pigment nickel-azo yellow and the non-azo type pigments like the phosphotungstic and phosphomolydicacid types, the indanthrones-blue and violet, and the phthalocyanines, blue and green.

The polymerizable unsaturated polyester pigmented in accordance with the invention is a partial condensation product of at least one polyhydric alcohol and at least one unsaturated polycarboxylic acid or anhydride. These polymerizable partial condensates are obtained by reacting one or more polyhydric alcohols with one or more of the unsaturated polycarboxylic acids or anhydrides having in the molecule at least one polymerizable reactive $\Delta^{2,3}$-enoyl group of the structure

The polymerizable unsaturated polyester is thus one having polymerizable reactive $\Delta^{2,3}$-enoyl groups contained in dioyl radicals (connecting polyhydric alcohol residues through ester linkages) which dioyl radicals may be defined as $\Delta^{2,3}$-enedioyl radicals.

The reactants are heated at polyester-forming temperature until a fluid, mobile resinous polyester is obtained. Usually, the pigmented dextran will be mixed with this fluid product. However, in some instances, the partial condensate may be cooled to solid condition, and ground with the pigmented dextran to obtain a pigmented polyester in powder form.

The polymerizable composition may comprise a polyester of a glycol with a dicarboxy alkene having four to five carbon atoms in which the carboxy radicals are attached to adjacent carbon atoms, i.e., maleic, fumaric, itaconic, citraconic, or mesaconic acid or the corresponding anhydrides.

However, as long as the $\Delta^{2,3}$-enoyl groups are polymerizably reactive, the polycarboxylic acid is not necessarily a hydrocarbon dicarboxylic acid but may contain any groups (e.g., chloro groups) which do not hinder the polymerizable reactivity of the $\Delta^{2,3}$-enoyl groups.

The polyester may be an ester of a polycarboxylic acid with any glycol such as any polymethylene glycol in the series from ethylene glycol to decamethylene glycol, propylene glycol, any butylene glycol, any polyethylene glycol in the series from diethylene glycol to nona-ethylene glycol, dipropylene glycol, any glycerol mono-basic acid mono-ester (in either the alpha-or-beta-position) such as monoformin or monoacetin, any monoether of glycerol with a monohydric alcohol such as monomethylin or monoethylin, or any dihydroxy alkane in which the hydroxy radicals are attached to carbon atoms that are primary, secondary or both, in the series from dihydroxy butane to dihydroxy decane.

Also, the polyhydric alcohol may be one the molecule of which has two or three free hydroxy groups and consists of an ether of one or two molecules of allyl or methallyl alcohol with one molecule of a polyhydroxy compound such as glycerol, pentaglycerol, pentaerythritol, butanetetrol-1,2,3,4, a trihydroxy normal alkane having from four to five carbon atoms such as butanetriol-1,2,3, or a monoalkyl ether of pentaerythritol or butane-tetrol-1,2,3,4 in which the alkyl radical has from one to four carbon atoms and from one to two hydrogen atoms attached to the same carbon atom as the ether linkages, such as the monomethyl or monoisobutyl ether of pentaerythritol.

In these polyesters, part of the unsaturated dicarboxylic acid is sometimes replaced by a saturated dicarboxylic acid or anhydride such as any normal acid of the series from oxalic and malonic acid to sebacic acid, or any benzene dicarboxylic, naphthalene dicarboxylic or cyclohexane dicarboxylic acid, or diglycolic, dilactic, or resorcinol diacetic acid. Those compositions comprising the unsaturated dicarboxylic acid may also be combined with the pigmented dextran.

The polyesters are often marketed in admixture with modifying monomers having at least one polymerizable reactive $CH_2=C<$ group per molecule. Such mixtures may be regarded as a solution of the polyester in the monomer.

Monomers added to the polyester include styrene, o-methylstyrene, methyl methacrylate, methyl acrylate, vinyl acetate, diallyl phthalate, diallyl oxalate, diallyl diglycolate, triallyl citrate, carbonyl-bis(allyl lactate), maleyl bis-(allyl lactate), fumaryl bis(allyl lactate), succinyl bis-(allyl lactate), adipyl bis-(allyl lactate), sebacyl bis-(allyl lactate), phthalyl bis-(allyl lactate), fumaryl bis-(allyl glycolate), carbonyl bis-(allyl glycolate), carbonyl bis-(allyl salicylate), tetra-(allyl glycolate) silicate and tetra-(allyl lactate) silicate.

These mixtures of the polyesters with the cross-linking monomer may also be pigmented by the inclusion therein of the pigmented dextran. The latter is usually preferably distributed in the fluid polyester before the monomer is added.

It has been found that, if dextran is present in the mass comprising a polyhydric alcohol and a polycarboxylic acid or its anhydride, before the reactants are heated to the polyester forming temperature, the dextran functions as a co-reactant and enters the polyester molecule to influence the properties of the product.

The effect of the dextran is to modify the thermosetting characteristics of the polyester. Those polyesters obtained from the reactants including dextran present at the initiation of the reaction have what may be termed a longer thermoplastic stage than conventional polyesters and can be heated, cooled, and re-heated more often before final setting in infusible, insoluble condition. This facilitates handling of the polyesters since premature hardening is not a problem.

In one embodiment of the invention, the pigmented dextran is mixed with the polyhydric alcohol and polycarboxylic acid or anhydride before heating the same to the polyester-forming temperature. The dextran present in the particles comprising the pigment enters into the polyester forming reaction, to modify the properties of the product, to the extent of its presence, in the manner aforesaid and to lock the pigment in the polyester structure was an integral component thereof, which is a new effect in a pigmented unsaturated polymerizable polyester.

The following examples are illustrative of the invention, it being understood that these examples are not intended as limitative.

Example I

About 5% of TiO$_2$ is thoroughly worked into a mass comprising 80% of native, unhydrolyzed, water-insoluble L.m. B–523 dextran (National Regional Research Labs. classification) and 15% water.

The mass is then dried and ground to a powder. Ten parts of the powder are mixed with 90 parts of a fluid polyester obtained by heating a mixture of 0.5 mol (49 parts) maleic anhydride and 1.2 mol (92 parts) of propylene glycol to 190° C. until a clear resinous liquid is obtained.

The resulting product is a fluid polymerizable polyester having the pigmented dextran distributed therethrough.

Example II

About 10% iron oxide is worked into a dextran mass as in Example I containing 78% of the dextran and 12% of water.

About 20 parts of the powdered pigmented dextran is ground with 80 parts of a polyester obtained by heating equimolecular proportions of triethylene glycol and maleic acid together until a resinous liquid partial condensate thereof is obtained.

Example III

A dextran pigmented yellow is produced by thoroughly mixing 5% of chrome yellow with a mass comprising 94% of water-soluble native unhydrolyzed L.m. B–512 dextran and 1% of water.

About 14.3 parts of the pigmented dextran powder are mixed with 40.4 parts of hot glycerol and the hot mixture is added to 45.3 parts of melted maleic anhydride. The mass is boiled for 10–15 minutes with continuous stirring and then cooled. It solidifies to a clear yellow resin which can be reheated and cooled several times and finally set to hard, infusible condition.

Example IV

A dextran uniformly colored black is prepared by thoroughly kneading 20% of carbon black into a mass comprising 65% of hydrolyzed L.m. B–512 dextran having a molecular weight of 20,000 to 200,000, 6% of water and 9% of dioctyl phthalate as plasticizer. The mass is dried and ground to a powder (the plasticizer is optional and may be omitted).

About 106 parts of diethylene glycol and 98 parts of alpha-propylene glycol are mixed and heated with agitation in an inert atmosphere at 150–165° C., until a fluid, resinous reaction product is obtained.

Ten parts of the pigmented dextran are mixed with 90 parts of the fluid polyester to obtain a resinous polymerizable black product.

Example V

A pigmented dextran is prepared by incorporating 10% of chrome yellow into a mass comprising 70% of native, unhydrolyzed L.m. B–523 dextran, 17% of water and 3% of ethyl alcohol, using a mechanical heater. The mass is dried and reduced to a fine powder.

About 20 parts of the pigmented dextran are ground with 80 parts of a solid polyester obtained as follows:

A mixture of 16.2 parts of native, unhydrolyzed B–512 dextran and 16.2 parts of glycerol was combined with a mixture of 16.2 parts of the dextran in melted maleic anhydride. The mass was heated for 12 minutes at 175° C. with constant stirring, until a clear, resinous homogeneous solution formed. The solution was cooled and solidified to a clear, light amber, resin which was reduced to a powder for commingling with the particulate pigmented dextran.

Example VI

A mass comprising 80% of L.m. B–523 native dextran, 5% of dioctyl phthalate and 15% of water is pigmented by thorough mechanical working with 10% by weight of lithol red. After drying, the mass is ground to a powder.

Fifteen parts of the powder are dispersed in a fluid polyester prepared as in Example I.

Example VII

A pigmented mass is prepared by mechanically working 20 parts of the pigment dibenzanthrone violet (marketed as Platinum Violet by E. I. du Pont de Nemours & Co. Inc.) into 98 parts of L.m. B–512 native dextran and 2% of water. Fifteen parts of the powder finally obtained is dispersed in 85 parts of a clear resinous liquid polyester produced as follows:

About 1470 parts of maleic anhydride, 825 parts of ethylene glycol, 197 parts of allyl alcohol, and 0.22 part of catechol are placed in a reaction vessel equipped with an agitator and a water-cooled distillation condenser. Carbon dioxide is passed through the reaction mixture throughout the reaction so that the mixture is blanketed with the inert gas at all times.

The mixture is heated with stirring to 165° C. and maintained at that temperature for about 30 minutes. About 5.7 parts of paratoluenesulfonic acid are added and heating at 165° C. is continued for an additional 45 minutes. At this point, about 134 parts of water and 118 parts of allyl alcohol have distilled off. The mixture is cooled to about 125° C., and after the addition of about 128 parts of allyl alcohol, is heated slowly to about 190° C. over a 2-hour period and then at 190–195° C. for an additional four hours.

Example VIII

A polyester is prepared by charging 638 parts (5.5 mols) of fumaric acid and 530 parts (5 mols) of diethylene glycol into a resin kettle together with 146 parts of tetrahydroabietyl alcohol. The mixture is heated for about 4 hours at 180° C. after which 146 parts of the alcohol (total, 1 mol) are added and the reacting mixture is heated to about 200° C. and maintained at that temperature for about 1.5 hours. During the reaction about 175 parts of water are freed and distilled off. A fluid, mobile polymerizable partial condensate of the reactants is obtained. It is pigmented by dispersing therein (10 parts to 90 parts) a pigmented dextran powder obtained as in Example I.

Example IX

Ten parts of native B–512 dextran, 10 parts of glycerin, and 80 parts of water are mixed and the mass is deposited as a layer from which the water is evaporated in the air. The resulting film is broken into small pieces and ground with 10% by weight of lithol red. Ten parts of the pigmented powder thus obtained are dispersed in a fluid polyester prepared as in Example I. Five parts of monomeric styrene are mixed into the pigmented polyester before it is cured.

Example X

Ten parts of dextran (M.W. 500,000 average), 10 parts of sorbitol, 80 parts of water and 10 parts of chrome yellow are uniformly mixed together. The pigmented mass is deposited on a surface and the water is evaporated, leaving a pigmented glycerin-containing dextran film which is broken up and 10 parts thereof mixed with 90 parts of the polyester of Example IV.

Example XI

Ten parts of glycerin are added to 20 parts of dextran (native B–512) to obtain a mass which is then milled with 10% of iron oxide. Ten parts of the pigmented dextran containing glycerin are then incorporated into 90 parts of the polyester of Example I. Three parts of styrene are added to the pigmented fluid polyester before it is cured.

Numerous other examples embodying the invention may be formulated. Dextran of other molecular weights between 5000 and that of native dextran (estimated to be in the millions) and optionally containing glycerol or other polyhydric alcohol, is worked with pigments, organic or inorganic, in the manner described herein, the pigmented powder being then dispersed in a fluid mobile unsaturated polyester, commingled with a particulate polymerizable polyester, or mixed with the polyester-forming reactants and heated at polyester-forming temperature. Any of the modified or unmodified unsaturated polymerizable polyesters of the general types disclosed herein may be pigmented by admixture with the pigmented dextran.

The amount of pigmented dextran powder incorporated in the polyester may vary and may be from 5 to 20%. Larger amounts may be used where heavy pigmentation is required. The amount of pigment incorporated in the dextran may also vary and may be from 5 to 20% or higher. Typical preferred pigmented polymerizable compositions according to the invention are those obtained from mixtures of the polycarboxylic acid or anhydride and the polyhydric alcohol and including either as a coreactant or as an addition to the partially formed polyester, 5 to 20% of pigmented dextran.

The pigmented polyesters are used for the usual applications and hardened to the insoluble, infusible condition by heat.

It will be apparent that various changes and modifications may be made in the details given. For instance, the use of a plasticizer as an aid to incorporating the pigment into the dextran is optional and is usually resorted to only when the dextran is not mixed with glycerin, a glycol, sorbitol or other equivalent hydrophilic agent. However, any of the plasticizers commonly used with the polyester resins may be included in any of the examples given or in any similar embodiments of the invention in which the particular dextran, pigment and polyester are different from those exemplified but within the scope of the disclosure. Other variations, such as the conditions (time, temperature, specific reactants) for producing the polyester may be made. Since such changes and modifications may be made without departing from the invention it is not intended to limit the same except as defined in the appended claims.

What is claimed is:

1. A method of making a pigmented dextran-modified resin which consists in heating a mixture of a polyhydric alcohol and a polycarboxylic acid or anhydride thereof to reaction temperature and producing a liquid resinous mass, and thereafter admixing thereinto a powdered mass composed of pigment and water-insoluble dextran to produce a pigmented dextran-modified resin, the resin forming constituents being admixed and reacted together in the proportionate amounts in parts by weight consisting of diethylene glycol 530 parts, fumaric acid 638 parts and tetrahydroabietyl alcohol 146 parts, heating the mixture for about 4 hours at 180° C., and adding to the resultant reaction mixture 146 parts of tetrahydroabietyl alcohol, and heating the resultant resin-forming constituents to a temperature of about 200° C. for approximately one-and-one-half hours to distill off the water released during the reaction.

2. A method of making a pigmented dextran-modified resin which consists in heating a mixture of a polyhydric alcohol and a polycarboxylic acid or anhydride thereof to reaction temperature and producing a liquid resinous mass, and thereafter admixing thereinto a powdered mass composed of pigment and water-insoluble dextran to produce a pigmented dextran-modified resin, the resin forming constituents being admixed and reacted together in the proportionate amounts in parts by weight consisting of diethylene glycol 530 parts, fumaric acid 638 parts and tetrahydroabietyl alcohol 146 parts, heating the mixture for about 4 hours at 180° C., and adding to the resultant reaction mixture 146 parts of tetrahydroabietyl alcohol, and heating the resultant resin-forming constituents to a temperature of about 200° C. for approximately one-and-one-half hours to distill off the water released during the reaction, said pigmented dextran being incorporated into the resin in the proportionate amounts by weight of 10 parts pigmented dextran to 90 parts of said resin.

References Cited in the file of this patent

UNITED STATES PATENTS

| | | |
|---|---|---|
| 2,624,714 | Bigelow | Jan. 6, 1953 |
| 2,624,768 | Toulmin | Jan. 6, 1953 |
| 2,671,779 | Gaver et al. | Mar. 9, 1954 |
| 2,674,584 | Deniston | Apr. 6, 1954 |
| 2,823,188 | Novak | Feb. 11, 1958 |
| 2,826,557 | Wenzelberger | Mar. 11, 1958 |